(12) United States Patent
Wargo et al.

(10) Patent No.: US 12,623,860 B2
(45) Date of Patent: May 12, 2026

(54) PARCEL DISTRIBUTION CONTROL

(71) Applicant: Impact Automation, Inc., Columbia, MD (US)

(72) Inventors: Stephen G. Wargo, Columbia, MD (US); William G. Twigg, Columbia, MD (US); Jacob F. Twigg, Columbia, MD (US)

(73) Assignee: Impact Automation, Inc., Columbia, MD (US)

( * ) Notice: Subject to any disclaimer, the term of this patent is extended or adjusted under 35 U.S.C. 154(b) by 184 days.

(21) Appl. No.: 18/422,769

(22) Filed: Jan. 25, 2024

(65) Prior Publication Data

US 2024/0246772 A1     Jul. 25, 2024

Related U.S. Application Data

(60) Provisional application No. 63/441,166, filed on Jan. 25, 2023.

(51) Int. Cl.
B65G 47/31 (2006.01)
B65G 43/08 (2006.01)

(52) U.S. Cl.
CPC ............. B65G 47/31 (2013.01); B65G 43/08 (2013.01); *B65G 2203/0208* (2013.01); *B65G 2811/0631* (2013.01); *B65G 2811/095* (2013.01)

(58) Field of Classification Search
CPC ................... B65G 47/31; B65G 43/08; B65G 2203/0208; B65G 2811/0631; B65G 2811/095; B65G 43/10
See application file for complete search history.

(56) References Cited

U.S. PATENT DOCUMENTS

| | | | | | |
|---|---|---|---|---|---|
| 6,690,995 B2 * | 2/2004 | Prutu | ................... | G01G 19/005 198/572 | |
| 6,952,628 B2 * | 10/2005 | Prutu | ....................... | B07C 1/10 198/572 | |
| 9,233,799 B1 * | 1/2016 | Mishra | ................... | B65G 43/08 | |
| 9,399,557 B1 * | 7/2016 | Mishra | ................... | B65G 43/08 | |

(Continued)

FOREIGN PATENT DOCUMENTS

| | | | | | |
|---|---|---|---|---|---|
| JP | | 6550062 B2 * | 7/2019 | ........... | B65G 47/261 |
| WO | WO-2015009660 A1 * | | 1/2015 | ............... | B07C 3/02 |

(Continued)

*Primary Examiner* — Gene O Crawford
*Assistant Examiner* — Abby A Jorgensen
(74) *Attorney, Agent, or Firm* — Rahman LLC

(57) ABSTRACT

An automated parcel distribution system includes a plurality of operatively connected individual conveyor belts arranged in zones; a set of sensors arranged on lateral sides of the conveyor belts and at the boundaries between adjacent conveyor belts; and a processor configured to adjust the speed of individual conveyor belts based on sensor data to evenly distribute parcels on the conveyor belts. The processor may receive the data from the set of sensors and determine the volume of parcels in each zone based on width and length measurements of the parcels obtained from the sensors. The processor may slow down, speed up, or maintain a speed of the conveyor belts for a predetermined period in order to evenly distribute the parcels on the conveyor belts. The set of sensors may be arranged on lateral sides and at the boundary between two adjacent conveyor belts.

20 Claims, 13 Drawing Sheets

(56)           References Cited

U.S. PATENT DOCUMENTS

| 2001/0030102 A1* | 10/2001 | Woltjer | B65G 47/1492 |
| | | | 198/388 |
| 2018/0339865 A1* | 11/2018 | Schroader | G06V 20/52 |
| 2021/0292100 A1* | 9/2021 | Schroader | B65G 43/08 |
| 2022/0112034 A1* | 4/2022 | Dwivedi | B65G 47/31 |

FOREIGN PATENT DOCUMENTS

| WO | WO-2018031956 A2 * | 2/2018 | B07C 5/3416 |
| WO | WO-2021011833 A1 * | 1/2021 | B65G 47/681 |
| WO | WO-2023117521 A1 * | 6/2023 | G05B 19/4183 |

* cited by examiner

Figure 5:
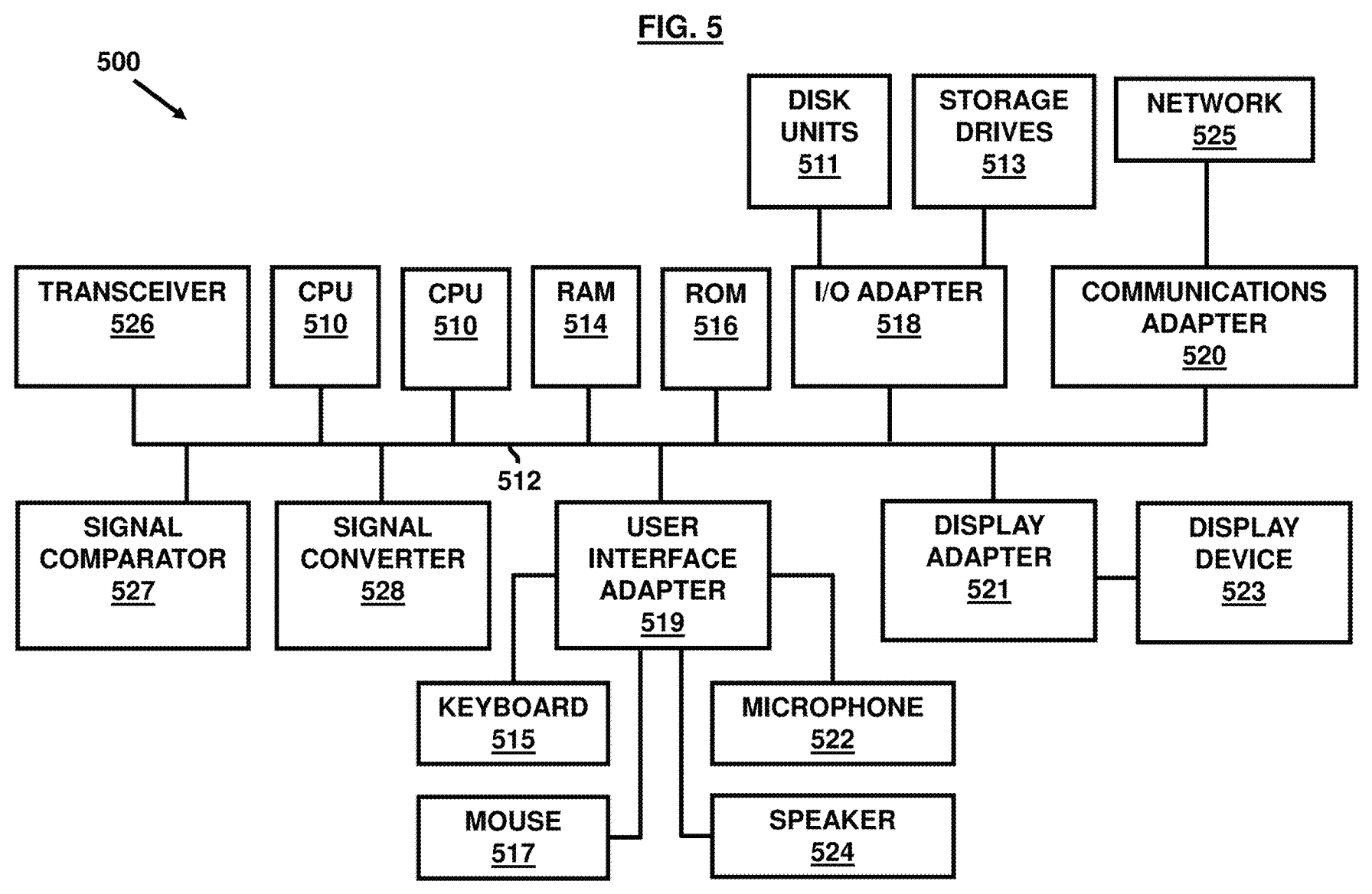

NETWORK 525

COMMUNICATIONS ADAPTER 520

STORAGE DRIVES 513

DISK UNITS 511

I/O ADAPTER 518

DISPLAY DEVICE 523

DISPLAY ADAPTER 521

ROM 516

RAM 514

CPU 510

CPU 510

TRANSCEIVER 526

512

USER INTERFACE ADAPTER 519

MICROPHONE 522

SPEAKER 524

KEYBOARD 515

MOUSE 517

SIGNAL CONVERTER 528

SIGNAL COMPARATOR 527

C → Reducing the speed if a parcel volume on a particular conveyor belt exceeds a threshold limit

700

730

D → Maintaining or increasing the speed of the conveyor belts if a parcel volume on a particular conveyor belt is below a threshold limit

700

E

735

Adjusting the speed of the conveyor belts independently of each other to disperse parcel volume on a particular conveyor belt

700

F

740

Adjusting the speed of the conveyor belts based on a comparison of a volume of parcels in a particular zone with a volume of parcels in adjacent zones

G →

Utilizing data from the set of sensors at a boundary between two adjacent conveyor belts to adjust the speed of the conveyor belts in adjacent zones
— 745

700

H →

Adjusting the speed of the conveyor belts by adjusting the speed of the conveyor belt in a zone based on a volume of a number of parcels in the zone
— 750

700

700

755

Calculating parcel volume using width and length measurements of each parcel that is detected by the set of sensors

700

760

Determining a duration that a sensor is blocked to calculate parcel length

Figure 8B:
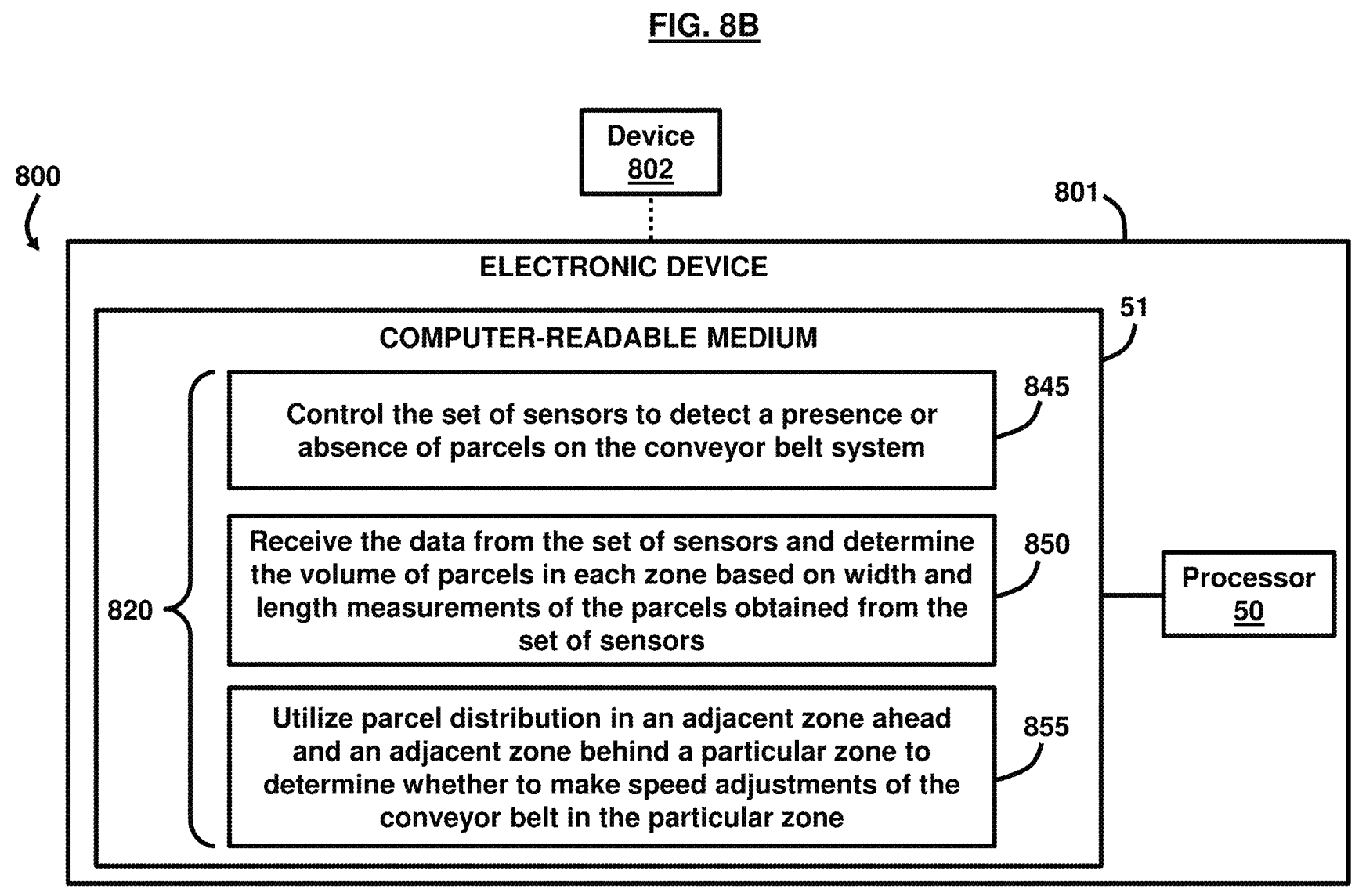

802 Device

ELECTRONIC DEVICE

COMPUTER-READABLE MEDIUM

51

Processor 50

820

845 Control the set of sensors to detect a presence or absence of parcels on the conveyor belt system 850 Receive the data from the set of sensors and determine the volume of parcels in each zone based on width and length measurements of the parcels obtained from the set of sensors 855 Utilize parcel distribution in an adjacent zone ahead and an adjacent zone behind a particular zone to determine whether to make speed adjustments of the conveyor belt in the particular zone

PARCEL DISTRIBUTION CONTROL

CROSS-REFERENCE TO RELATED APPLICATIONS

This applications claims priority to U.S. Provisional Ser. No. 63/441,166, filed on Jan. 25, 2023, the complete disclosure of which, in its entirety, is herein incorporated by reference.

BACKGROUND

Technical Field

The embodiments herein generally relate to mail and packaging sorting equipment and systems, and more particularly to conveyor-belt, accumulator systems for transferring and transporting parcels such as mail, envelopes, and packages in mail sorting systems.

Description of the Related Art

This background description includes information that may be useful in understanding the present invention. It is not an admission that any of the information provided herein is prior art or relevant to the presently claimed invention or that any publication specifically or implicitly referenced is prior art.

By nature of the mail/package sorting, loading, and unloading process, mail/packages are typically deposited onto conveyors in sporadic batches. As batches of mail are transported along a series of conveyors, the volume of the batches of mail/packages can tend to be overly concentrated in some areas of the conveyor belts thus causing backups or excessive mail/package build-up when unloading the mail/packages from the conveyor belts. This distribution of mail/package parcels, combined with the sporadic batch input onto the conveyor belts, generally results in an uneven density of mail/packages along the series of conveyors including instances of a lot of volume of mail/packages and other instances of very little volume. Conventional mail/packaging systems typically utilize a series of conveyor belts onto which the mail/packages are input and then these parcels travel along the conveyor belts until they are unloaded, sometimes by humans and sometimes by automatic discharge into an output bin of some type. However, when too much mail/packages are output at once; i.e., too large a volume of parcel, then the person who is unloading the parcels cannot keep up with this large volume and mail/packages can fall onto the floor, get lost, damaged, and/or the conveyor belt may become backed up with too many parcels for timely output. Such challenges can also occur in an automatic discharge/output system such that the output area/bin may become overly saturated with accumulated parcels.

SUMMARY

In view of the foregoing, an embodiment herein provides an automated parcel distribution system comprising a plurality of operatively connected individual conveyor belts arranged in zones; a set of sensors arranged on lateral sides of the conveyor belts and at the boundaries between adjacent conveyor belts; and a processor configured to adjust the speed of individual conveyor belts based on sensor data to evenly distribute parcels. The processor may receive the data from the set of sensors and determine the volume of parcels in each zone based on width and length measurements of the parcels obtained from the sensors. The processor may slow down, speed up, or maintain a speed of the conveyor belts for a predetermined period in order to evenly distribute the parcels on the conveyor belts. The system may comprise a counterpart component aligned with at least one sensor of the set of sensors to provide a limit to a distance of a sensing view of the at least one sensor. The set of sensors may be arranged on lateral sides and at the boundary between two adjacent conveyor belts. The plurality of operatively connected individual conveyor belts may be aligned together and linked to move independently of each other. The processor may control the speed of each conveyor belt independently.

Another embodiment provides a method for controlling parcel distribution on a conveyor belt system, the method comprising receiving parcel data from a set of sensors on the conveyor belt system; analyzing the parcel data to determine a volume of parcels in each zone of the conveyor belt system; and adjusting a speed of individual conveyor belts independently of each other based on the analyzed parcel data to maintain optimal parcel distribution in the conveyor belt system. The method may comprise reducing the speed if a parcel volume on a particular conveyor belt exceeds a threshold limit. The method may comprise maintaining or increasing the speed of the conveyor belts if a parcel volume on a particular conveyor belt is below a threshold limit. The method may comprise adjusting the speed of the conveyor belts independently of each other to disperse parcel volume on a particular conveyor belt. The method may comprise adjusting the speed of the conveyor belts based on a comparison of a volume of parcels in a particular zone with a volume of parcels in adjacent zones. The method may comprise utilizing data from the set of sensors at a boundary between two adjacent conveyor belts to adjust the speed of the conveyor belts in adjacent zones. The method may comprise adjusting the speed of the conveyor belts by adjusting the speed of the conveyor belt in a zone based on a volume of a number of parcels in the zone. The method may comprise calculating parcel volume using width and length measurements of each parcel that is detected by the set of sensors. The method may comprise determining a duration that a sensor is blocked to calculate parcel length.

Another embodiment provides a computer-readable storage medium comprising computer-executable instructions that when executed cause a processor of a computing device to receive parcel data from a set of sensors on a plurality of operatively connected individual conveyor belts in a conveyor belt system; analyze the parcel data to determine a volume of parcels in each zone of the conveyor belts; and adjust a speed of individual conveyor belts independently of each other based on the analyzed parcel data to maintain optimal parcel distribution in the conveyor belt system. The computer-readable storage medium, wherein the instructions, when executed, may further cause the processor to control the set of sensors to detect a presence or absence of parcels on the conveyor belt system. The computer-readable storage medium, wherein the instructions, when executed, may further cause the processor to receive the data from the set of sensors and determine the volume of parcels in each zone based on width and length measurements of the parcels obtained from the set of sensors. The computer-readable storage medium, wherein the instructions, when executed, may further cause the processor to utilize parcel distribution in an adjacent zone ahead and an adjacent zone behind a particular zone to determine whether to make speed adjustments of the conveyor belt in the particular zone.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 5 is a block diagram of a computer system used in accordance with the embodiments herein;

FIG. 6 is a block diagram illustrating an automated parcel distribution system, according to an embodiment herein;

FIG. 8B is a block diagram illustrating a system further executing computer-executable instructions for controlling parcel distribution on a conveyor belt system, according to an embodiment herein.

Figure 1:
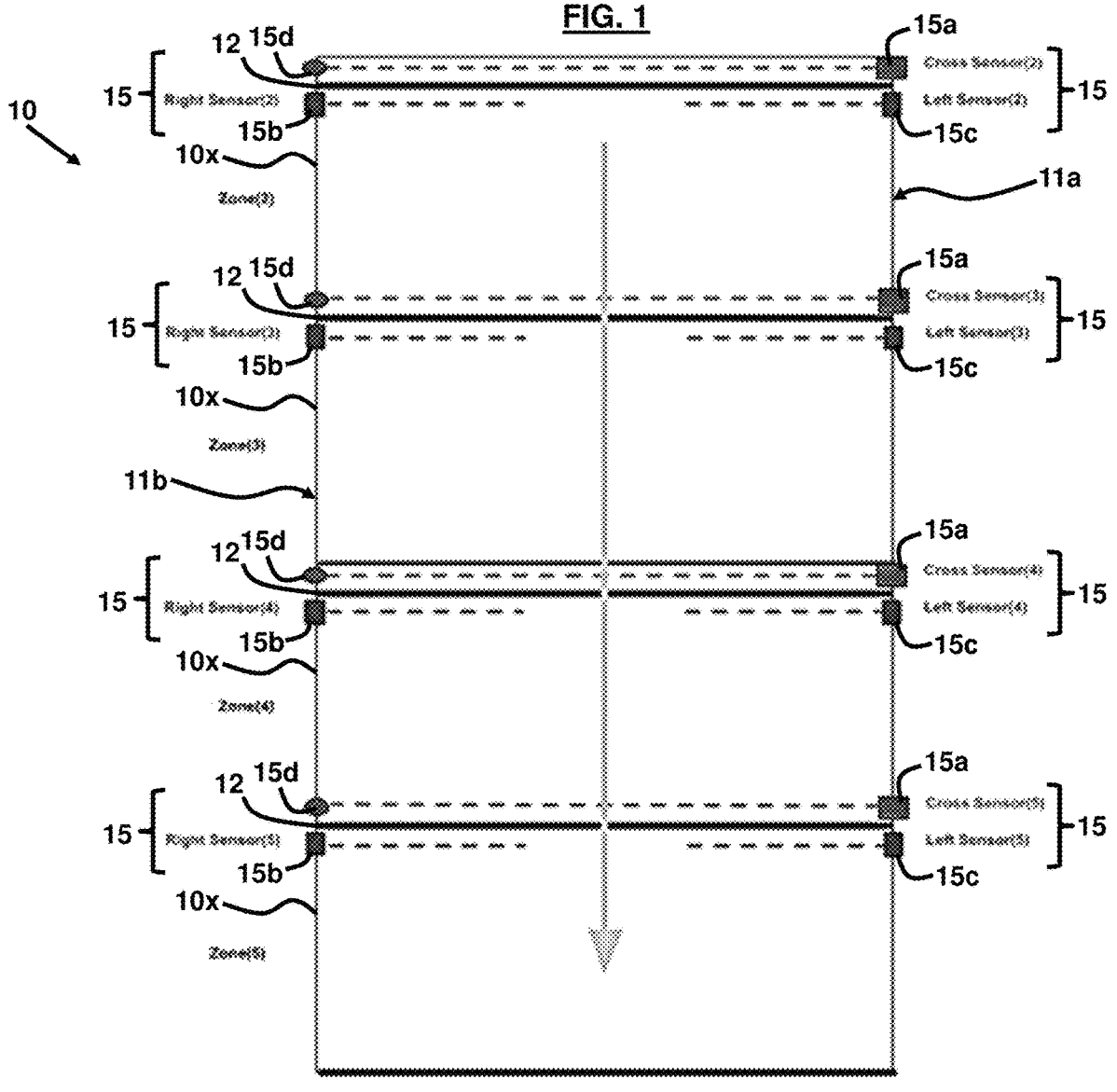
FIG. 1 is a schematic diagram of a conveyor belt system with a series of sensors, according to an embodiment herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

It will be understood that when an element or layer is referred to as being "on", "connected to", or "coupled to" another element or layer, it may be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present. It will be understood that for the purposes of this disclosure, "at least one of X, Y, and Z" or "any of X, Y, and Z" may be construed as X only, Y only, Z only, or any combination of two or more items X, Y, and Z (e.g., XYZ, XY, XZ, YZ).

The description herein describes inventive examples to enable those skilled in the art to practice the embodiments herein and illustrate the best mode of practicing the embodiments herein. Upon reading the following description in light of the accompanying drawing figures, those skilled in the art will understand the concepts of the disclosure and will recognize applications of these concepts not particularly addressed herein.

Although the terms first, second, etc. may be used herein to describe various elements, but these elements should not be limited by these terms as such terms are only used to distinguish one element from another. For example, a first element could be termed a second element, and, similarly, a second element could be termed a first element, etc. without departing from the scope of the present disclosure. As used herein, the term "and/or" includes any and all combinations of one or more of the associated listed items.

Moreover, when an element is referred to as being "connected", "operatively connected", or "coupled" to another element, it can be directly connected or coupled to the other element or intervening elements may be present. Conversely, when an element is referred to as being "directly connected" or "directly coupled" to another element, there are no intervening elements present.

Furthermore, although the terms "upper", "lower", "bottom", "side", "intermediate", "middle", and "top", etc. may be used herein to describe various elements, but these elements should not be limited by these terms. These terms are only used to distinguish one element from another. For example, a first element could be termed an "upper" element and, similarly, a second element could be termed an "upper" element depending on the relative orientations of these elements.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprise(s)", "comprising", "include(s)", and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having meanings that are consistent with their meanings in the context of this specification and the relevant art and will not be interpreted in an idealized or overly formal sense unless expressly so defined herein.

The embodiments herein provide an automated technique of receiving, onto a conveyor belt system, a dense group of parcels such as envelopes, packages, and boxes and automatically spreading the parcels out evenly on a conveyor belt, utilizing sensors, and adjusting the speed(s) of individual conveyors in the conveyor belt system. Referring now to the drawings, and more particularly to FIGS. 1 through 8B, where similar reference characters denote corresponding features consistently throughout the figures, there are shown preferred embodiments. In the drawings, the size and relative sizes of components, layers, and regions, etc. may be exaggerated for clarity.

FIG. 1 is a schematic diagram of a conveyor belt system 10 with a plurality or set of sensors 15, according to an embodiment herein. The conveyor belt system 10 comprises a plurality of operatively connected individual conveyor belts 10x that are aligned together and linked to move independently from each other. While the drawings show only a few zones of the conveyor belt system 10, the embodiments herein are not restricted to a particular number of zones. In this regard, each zone may refer to one of the conveyor belts 10x in the overall conveyor belt system 10.

The set of sensors 15 are arranged on the lateral sides 11a, 11b of the conveyor belt system 10 and are further arranged at the boundary 12 between two adjacent conveyor belts 10x (i.e., two adjacent "zones") of the conveyor belt system 10. The set of sensors 15 may comprise any suitable type of sensor such as an image sensor, monitoring sensor, optical sensor, light sensor, photon sensor, motion sensor, or any other suitable type of sensor that can detect the presence and/or absence of objects in the field of vision of the sensor. Each set of sensors 15 comprise different types of sensors. For example, each set of sensors 15 comprises a cross sensor 15a that detects the entire width of the conveyor belt 10x, a right sensor 15b that detects up to a portion of the width of the conveyor belt 10x, and a left sensor 15c that detects up to a portion of the width of the conveyor belt 10x. According to an example, the right sensor 15b and the left sensor 15c are positioned on opposite sides 11a, 11b of the conveyor belt system 10 and are generally aligned to each other. The cross sensor 15a may be positioned adjacent to, but slightly spaced apart, from either the right sensor 15b or the left sensor 15c, and the cross sensor 15a may have a counterpart component 15d to provide a limit to the distance of the sensing view. The sensors 15 may have a substantially lateral field of view; e.g., 5-25°, although other field of view parameters are possible in accordance with the embodiments herein. According to an example, the cross sensor 15a may view the entire width of the conveyor belt 10x; e.g., 48-60 inches, for example; and the right and left sensors 15b, 15c may each have a limited view of approximately 12-20 inches onto the conveyor belt 10x. However, the embodiments herein are not restricted to these particular parameters of depth of view of the sensors 15.

Figure 2:
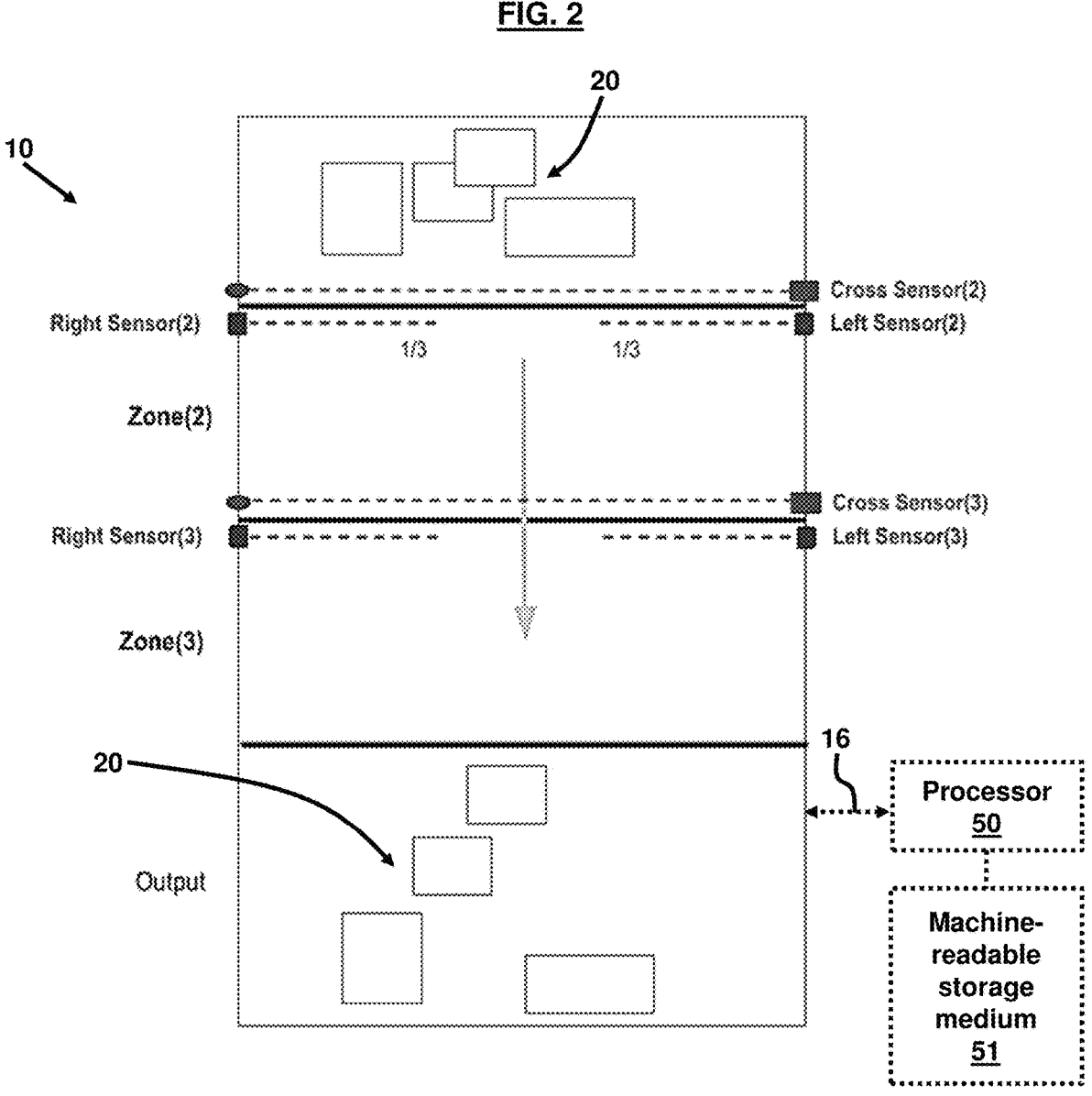
FIG. 2 is a schematic diagram of a conveyor belt and sensor system with parcels loaded thereon, according to an embodiment herein.

FIG. 2, with reference to FIG. 1, is a schematic diagram of a conveyor belt and sensor system 10 with parcels 20 loaded thereon, according to an embodiment herein. The set of sensors 15 monitor the amount of volume of parcels 20 going through that particular zone; i.e., that particular conveyor belt 10x. Parcels 20 are input onto Zone (1) of the conveyor belt system 10 such that Zone (1) runs at a constant speed. The parcels 20 then proceed to Zone (2), which then proceeds to Zone (3), etc. A processor 50 (shown in FIG. 2) uses the data 16 provided by the set of sensors 15 to determine if the amount of volume of parcels 20 in a particular zone is over a threshold limit. If the volume of parcels 20 meets or exceeds the threshold limit, then the processor 50 reduces the speed of the conveyor belt 10x in that particular zone for a predetermined amount of time; i.e., less than 1 second. If the volume of parcels 20 is less than the threshold limit, then the processor 50 may either increase the speed or maintain the current speed of the conveyor belt 10x in that particular zone. Using the parcel volume data 16 provided by each set of sensors 15 in a particular zone and the zone immediately before and immediately after that particular zone, the processor 50 increases/decreases/maintains the speed of the conveyor belt 10x in that particular zone. In this regard, the processor 50 utilizes a look-ahead and a look-behind approach to the zones in accessing the amount of volume of parcels 20 contained in the zone that is immediately ahead of the particular zone and the volume of parcels 20 contained in the zone that is immediately behind the particular zone. For example, if the particular zone is Zone (2), then the processor 50 considers the data 16 provided by the set of sensors 15 associated with Zone (1) and Zone (3) in determining whether to increase/decrease/ maintain the speed of the conveyor belt 10x in Zone (2). By having the set of sensors 15 arranged at the boundary 12 between two adjacent zones (i.e., two adjacent conveyor belts 10x), the processor 50 is able to receive data 16 from the set of sensors 15 related to the volume of parcels 20 on adjacent zones. Thus, the processor 50 may increase the speed of the conveyor belt 10x in Zone (3), for example, while decreasing the speed of the conveyor belt 10x in Zone (2), for example. By altering the speeds in this manner, the volume of the parcels 20 becomes dispersed; i.e., high volume of parcels 20 in Zone (2) become lower volume of parcels 20 in Zone (3), for example. This helps alleviate high volume and overcrowding of parcels 20 on the conveyor belt system 10, which allows for a more manageable and controlled output of the parcels 20 from the conveyor belt system 10x.

Figure 3:
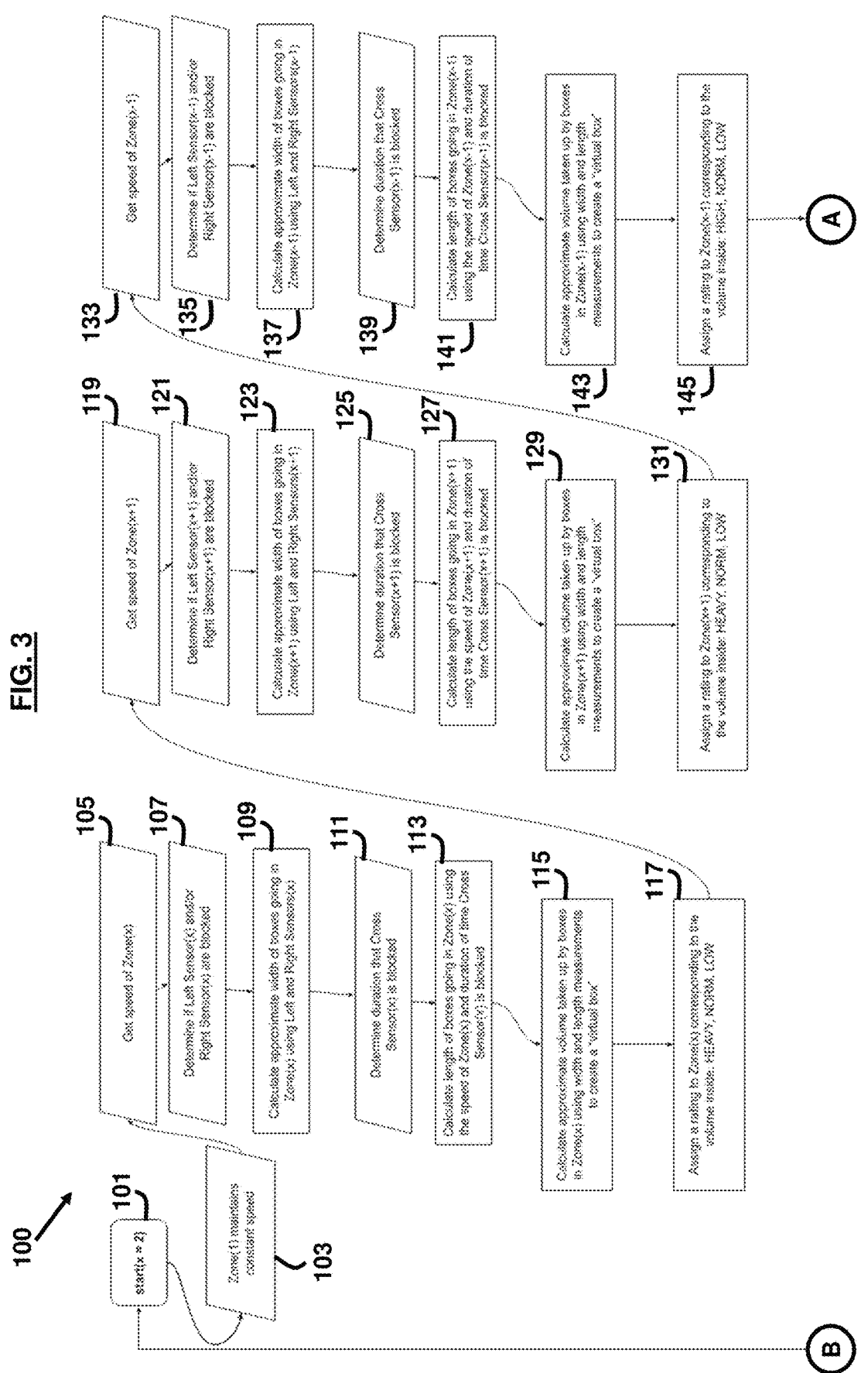
FIG. 3 is a flow diagram of a process of retrieving and processing data from the sensors on a conveyor belt and sensor system, according to an embodiment herein.

FIG. 3, with reference to FIGS. 1 and 2, is a flow diagram of a process 100 of retrieving and processing data 16 from the sensors 15 on a conveyor belt and sensor system 10, according to an embodiment herein. The process 100 considers the beginning of the overall methodology to begin at Zone (1). The process 100 may begin at block 101, which is considered the start block, although the process 100 is a feedback loop, thus the start block 101 may actually be considered a transition block. Next, in block 103, Zone (1) maintains a constant speed of the conveyor belt 10x in Zone (1). Next, in block 105, the process 100 acquires the speed of the conveyor belt 10x in Zone (x), where (x) refers to any particular zone in the conveyor belt system 10. Next, in block 107, the process 100 determines if the left sensor (x) and/or the right sensor (x) are blocked (e.g., blocked by parcels 20). Next, in block 109 the process 100 calculates an approximate width of the parcels 20 going in Zone (x) using the left and right sensors (x). Next, in block 111, the process 100 determines the duration that the cross sensor (x) is blocked. Next, in block 113, the process 100 calculates the length of the parcels 20 going in Zone (x) using the speed of Zone (x) and the duration of time the cross sensor (x) is blocked. Next, in block 115, the process 100 calculates an approximate volume taken up by parcels 20 in Zone (x) using width and length measurements of the parcels 20 to create a "virtual box". Next, in block 117, the process 100 assigns a rating to Zone (x) corresponding to the volume inside the Zone (x): HEAVY, NORM, LOW, etc.

Next, in block 119, the process 100 acquires the speed of Zone (x+1), where (x+1) refers to the zone immediately after (x). Next, in block 121, the process 100 determines if the left sensor (x+1) and/or the right sensor (x+1) are blocked. Next, in block 123, the process 100 calculates the approximate width of the parcels 20 going in Zone (x+1) using the left and right sensors (x+1). Next, in block 125, the process 100 determines the duration that the cross sensor (x+1) is blocked. Next, in block 127, the process 100 calculates the length of parcels 20 going in Zone (x+1) using the speed of Zone (x+1) and the duration of the time that the cross sensor (x+1) is blocked. Next, in block 129, the process 100 calculates the approximate volume taken up by parcels 20 in Zone (x+1) using the width and length measurements of the parcels 20 to create a "virtual box". Next, in block 131, the process 100 assigns a rating to Zone (x+1) corresponding to the volume inside the Zone (x+1): HEAVY, NORM, LOW, etc.

Next, in block 133, the process 100 acquires the speed of Zone (x−1), where (x−1) refers to the zone immediately before (x). Next, in block 135, the process 100 determines if the left sensor (x−1) and/or the right sensor (x−1) are blocked. Next, in block 137, the process 100 calculates the approximate width of the parcels 20 going in Zone (x−1) using the left and right sensors (x−1). Next, in block 139, the process 100 determines the duration that the cross sensor (x−1) is blocked. Next, in block 141, the process 100 calculates the length of parcels 20 going in Zone (x−1) using the speed of Zone (x−1) and the duration of the time that the cross sensor (x−1) is blocked. Next, in block 143, the process 100 calculates the approximate volume taken up by parcels 20 in Zone (x−1) using the width and length measurements of the parcels 20 to create a "virtual box". Next, in block 145, the process 100 assigns a rating to Zone (x−1) corresponding to the volume inside the Zone (x−1): HEAVY, NORM, LOW, etc.

Figure 4:
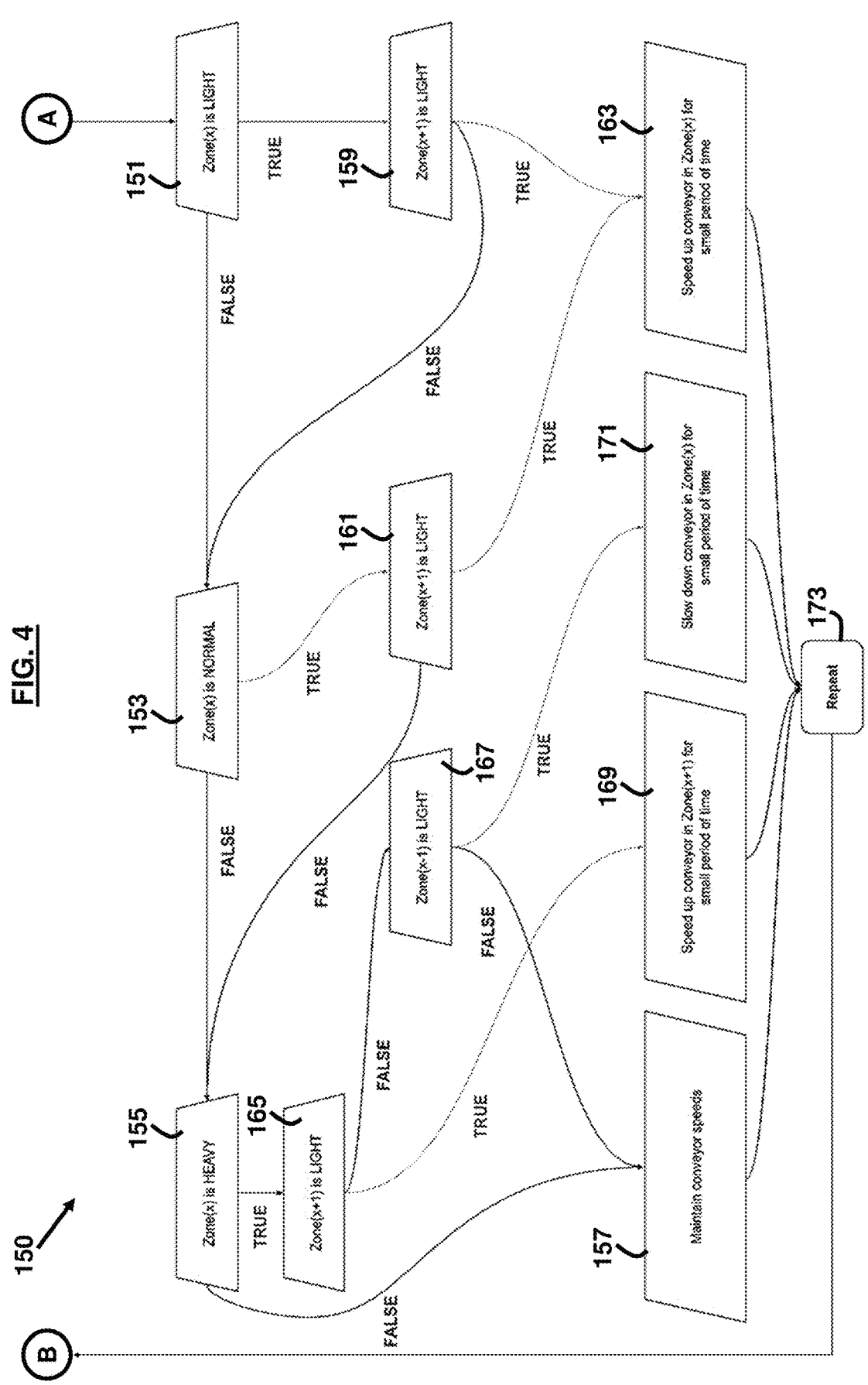
FIG. 4 is a flow diagram of a process of controlling the accumulator speed and parcel distribution on a conveyor belt and sensor system, according to an embodiment herein.

FIG. 4, with reference to FIGS. 1 through 3, is a flow diagram of a process 150 of controlling the accumulator speed and parcel distribution on a conveyor belt and sensor system, according to an embodiment herein. The process 150 continues from process 100 such that after block 145 in process 100 (FIG. 3), the next block 151 in process 150 considers if the Zone (x) is LIGHT. If no (False), then the process 150 moves to block 153 in which the process 150 considers if the Zone (x) is NORMAL. If no (False), then the process 150 moves to block 155 in which the process 150 considers if Zone (x) is HEAVY. If no (False), then the process 150 moves to block 157 and maintains the speeds of the conveyor belts 10x. In the decision of block 151, if yes (True), then the process 150 moves to block 159 in which the process 150 considers if Zone (x+1) is LIGHT. If no (False), then the process 150 moves to block 153. In block 153, if the decision is yes (True), then the process 150 moves to block 161 in which the process 150 considers whether Zone (x+1) is LIGHT. If no (False), then the process 150 moves to block 155. If the decision of block 155 is yes (True), then the process 150 moves to block 165 and considers whether Zone (x+1) is LIGHT. If no (False), then the process 150 moves to block 167 in which the process 150 considers whether Zone (x−1) is LIGHT. If the decision of block 167 is no (False), then the process moves to block 157 and maintains the speeds of the conveyor belts 10x. If the decision of block 167 is yes (True), then the process 150 moves to block 171 and slows down the conveyor belt in Zone (x) for a predetermined period of time, which is very small such as less than 1 second, for example; although other durations of time are possible. If the decision of block 165 is yes (True), then the process 150 moves to block 169 and speeds up the conveyor belt in Zone (x+1) for a predetermined period of time, which is very small such as less than 1 second, for example; although other durations of time are possible. If the decision of block 159 is yes (True), then the process 150 moves to block 163 and speeds up the conveyor belt in Zone (x) for a predetermined period of time, which is very small such as less than 1 second, for example; although other durations of time are possible. If the decision of block 161 is yes (True), then the process 150 also moves to block 163 and speeds up the conveyor belt in Zone (x) for a predetermined period of time, which is very small such as less than 1 second, for example; although other durations of time are possible. The outputs of each of blocks 157, 163, 169, 171 are to repeat 173 the process 150 by returning to block 101 of process 100 (of FIG. 3).

In an example, the embodiments herein can provide a computer program product configured to include a pre-configured set of instructions, which when performed, can result in actions as stated in conjunction with various figures herein. In an example, the pre-configured set of instructions can be stored on a tangible non-transitory computer readable medium. In an example, the tangible non-transitory computer readable medium can be configured to include the set of instructions, which when performed by a device, can cause the device to perform acts similar to the ones described here.

The embodiments herein may also include tangible and/or non-transitory computer-readable storage media for carrying or having computer-executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network. If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from low-end applications to advanced computer products having a display, a keyboard or other input device, and a central processor.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 50 coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet cards are just a few of the types of network adapters that may be used.

A representative hardware environment for practicing the embodiments herein is depicted in FIG. 5, with reference to FIGS. 1 through 4. This schematic drawing illustrates a hardware configuration of an information handling/computer system 500 in accordance with the embodiments herein. The system 500 comprises at least one processor or central processing unit (CPU) 510. The CPUs 510 are interconnected via system bus 512 to various devices such as a random access memory (RAM) 514, read-only memory (ROM) 516, and an input/output (I/O) adapter 518. The I/O adapter 518 can connect to peripheral devices, such as disk units 511 and tape drives 513, or other program storage devices that are readable by the system 500. The system 500 can read the inventive instructions on the program storage devices and follow these instructions to execute the methodology of the embodiments herein. The system 500 further includes a user interface adapter 519 that connects a keyboard 515, mouse 517, speaker 524, microphone 522, and/or other user interface devices such as a touch screen device (not shown) to the bus 512 to gather user input. Additionally, a communication adapter 520 connects the bus 512 to a data processing network 525, and a display adapter 521 connects the bus 512 to a display device 523 which may be embodied as an output device such as a monitor, printer, or transmitter, for example. Further, a transceiver 526, a signal comparator 527, and a signal converter 528 may be connected with the bus 512 for processing, transmission, receipt, comparison, and conversion of electric or electronic signals.

Figure 6:
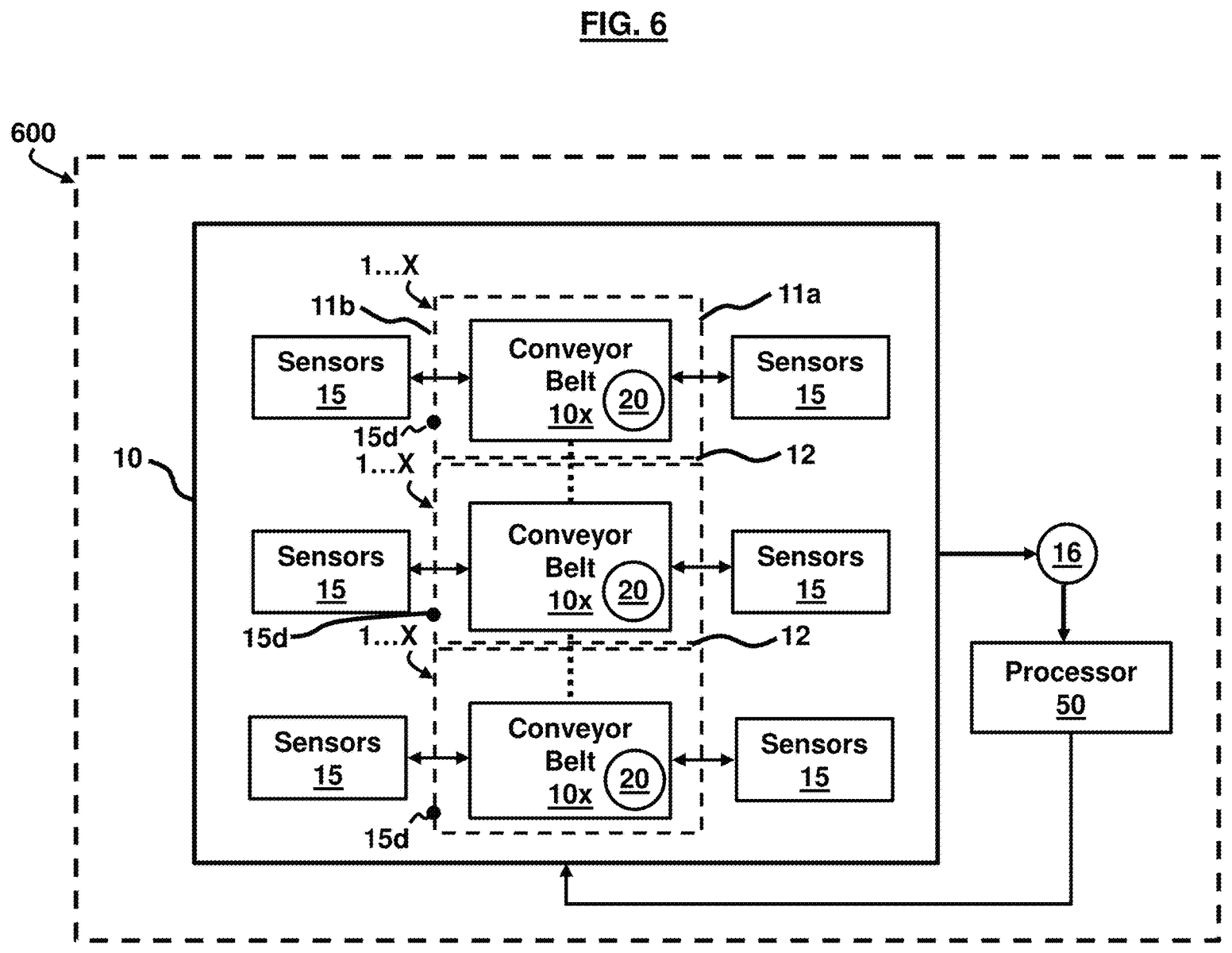

FIG. 6, with reference to FIGS. 1 through 5, is a block diagram illustrating an automated parcel distribution system 600 comprising a plurality of operatively connected individual conveyor belts 10x (of a conveyor belt system 10) arranged in zones (1 . . . X); a set of sensors 15 arranged on lateral sides 11a, 11b of the conveyor belts 10x and at the boundaries 12 between adjacent conveyor belts 10x; and a processor 50 configured to adjust the speed of individual conveyor belts 10x based on sensor data 16 to evenly distribute parcels 20 on the conveyor belts 10x. The set of sensors 15 are arranged adjacent to the plurality of operatively connected individual conveyor belts 10x in a conveyor belt system 10. The processor 50 may receive the data 16 from the set of sensors 15 and determine the volume of parcels 20 in each zone (1 . . . X) based on width and length measurements of the parcels 20 obtained from the sensors 15. The processor 50 may slow down, speed up, or maintain a speed of the conveyor belts 10x for a predetermined period in order to evenly distribute the parcels 20 on the conveyor belts 10x. The system 600 may comprise a counterpart component 15d aligned with at least one sensor 15a of the set of sensors 15 to provide a limit to a distance of a sensing view of the at least one sensor 15a. The set of sensors 15 may be arranged on lateral sides 11a, 11b and at the boundary 12 between two adjacent conveyor belts 10x. The plurality of operatively connected individual conveyor belts 10x may be aligned together and linked to move independently of each other. The processor 50 may control the speed of each conveyor belt 10x independently.

Figure 7A:
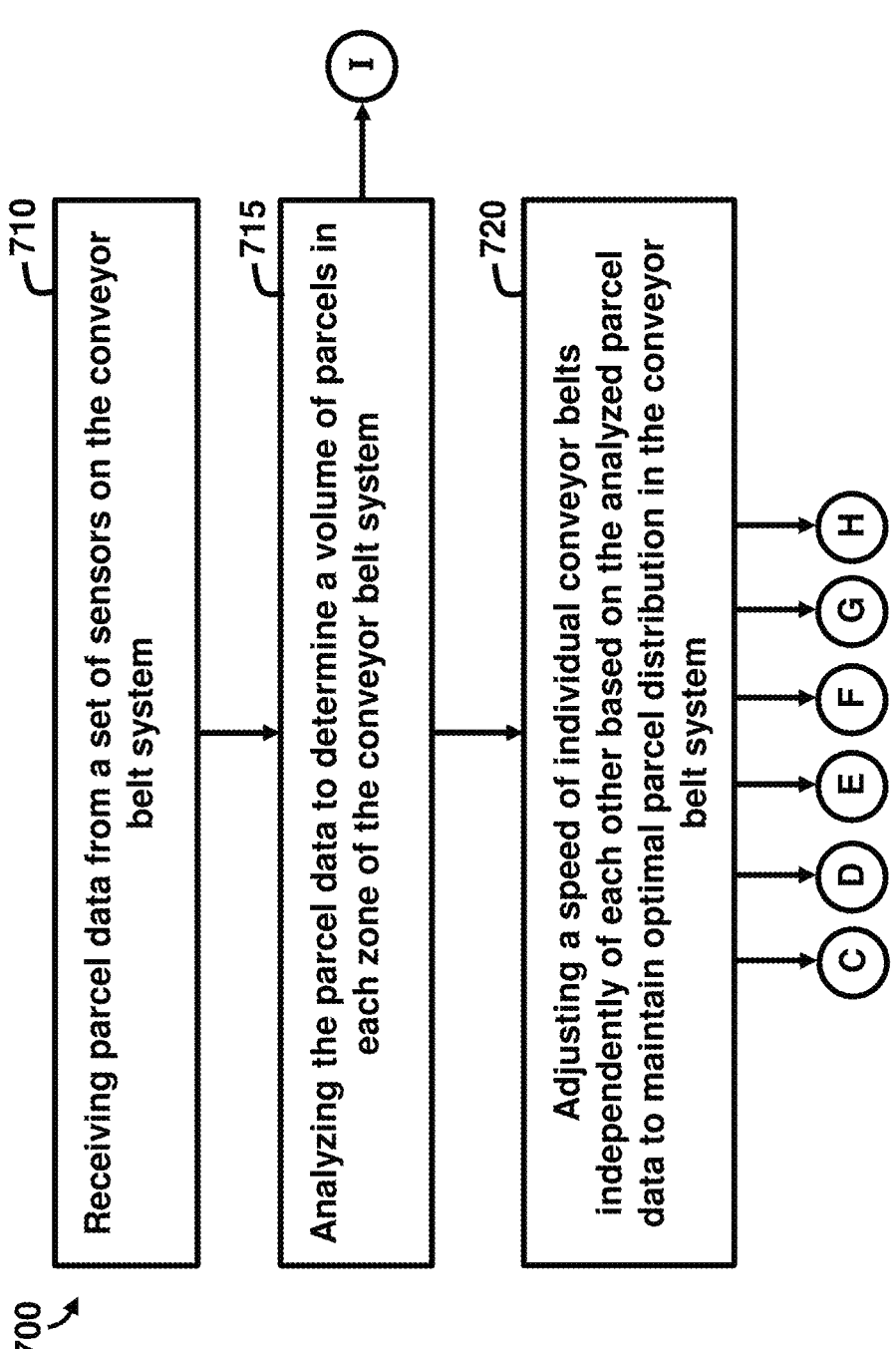
FIG. 7A is a flow diagram illustrating a method for controlling parcel distribution on a conveyor belt system, according to an embodiment herein.
Figures 7B, 7C:
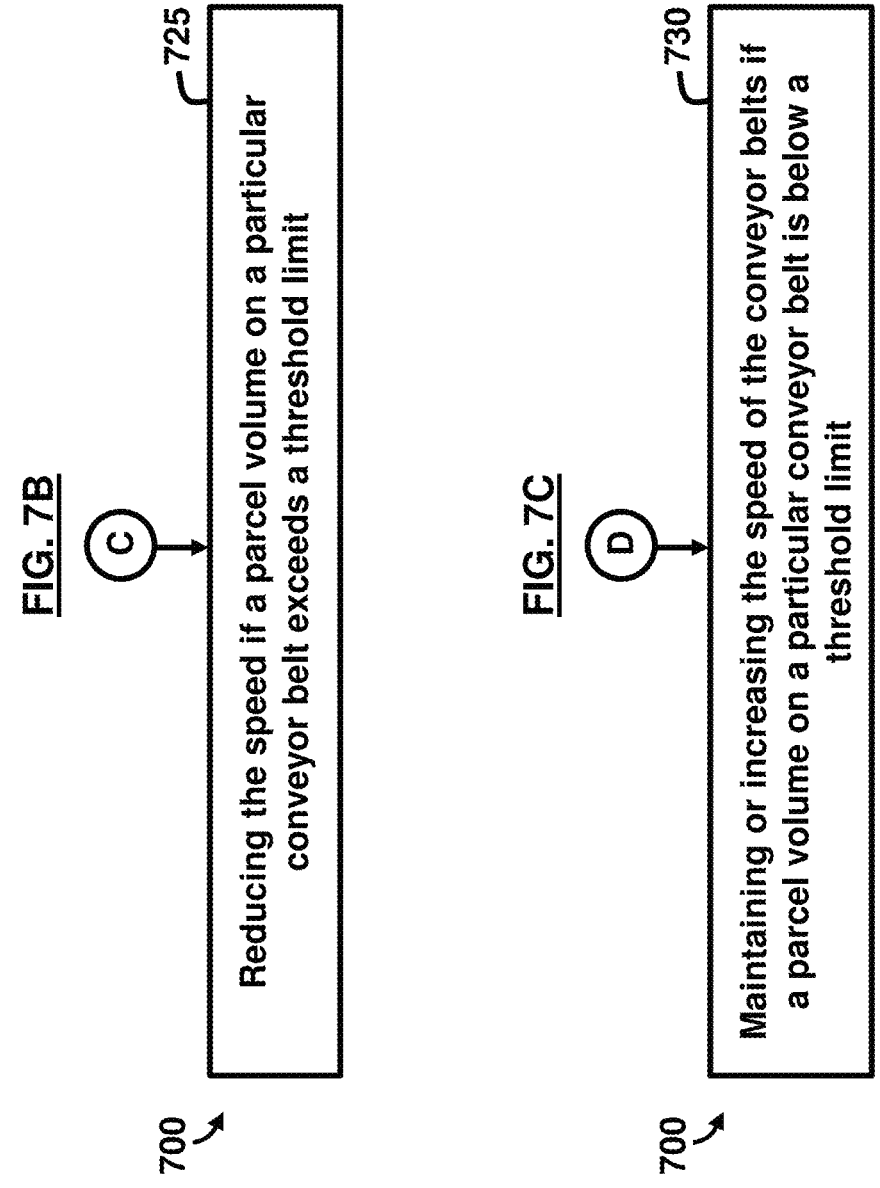
FIG. 7B is a flow diagram illustrating a method for adjusting the speed of the conveyor belts of the conveyor belt system, according to an embodiment herein.
FIG. 7C is a flow diagram illustrating another method for adjusting the speed of the conveyor belts of the conveyor belt system, according to an embodiment herein.
Figures 7D, 7E:
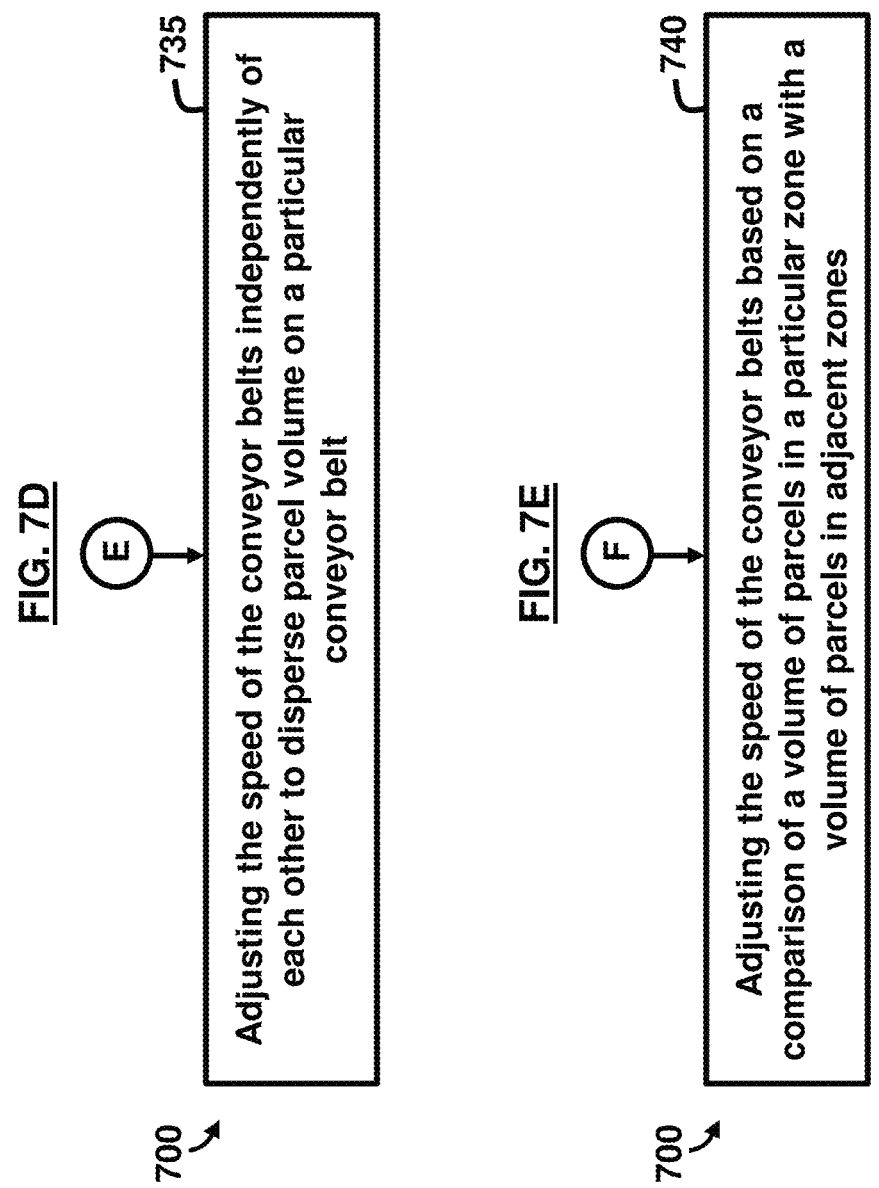
FIG. 7D is a flow diagram illustrating another method for adjusting the speed of the conveyor belts of the conveyor belt system, according to an embodiment herein.
FIG. 7E is a flow diagram illustrating another method for adjusting the speed of the conveyor belts of the conveyor belt system, according to an embodiment herein.
Figures 7F, 7G:
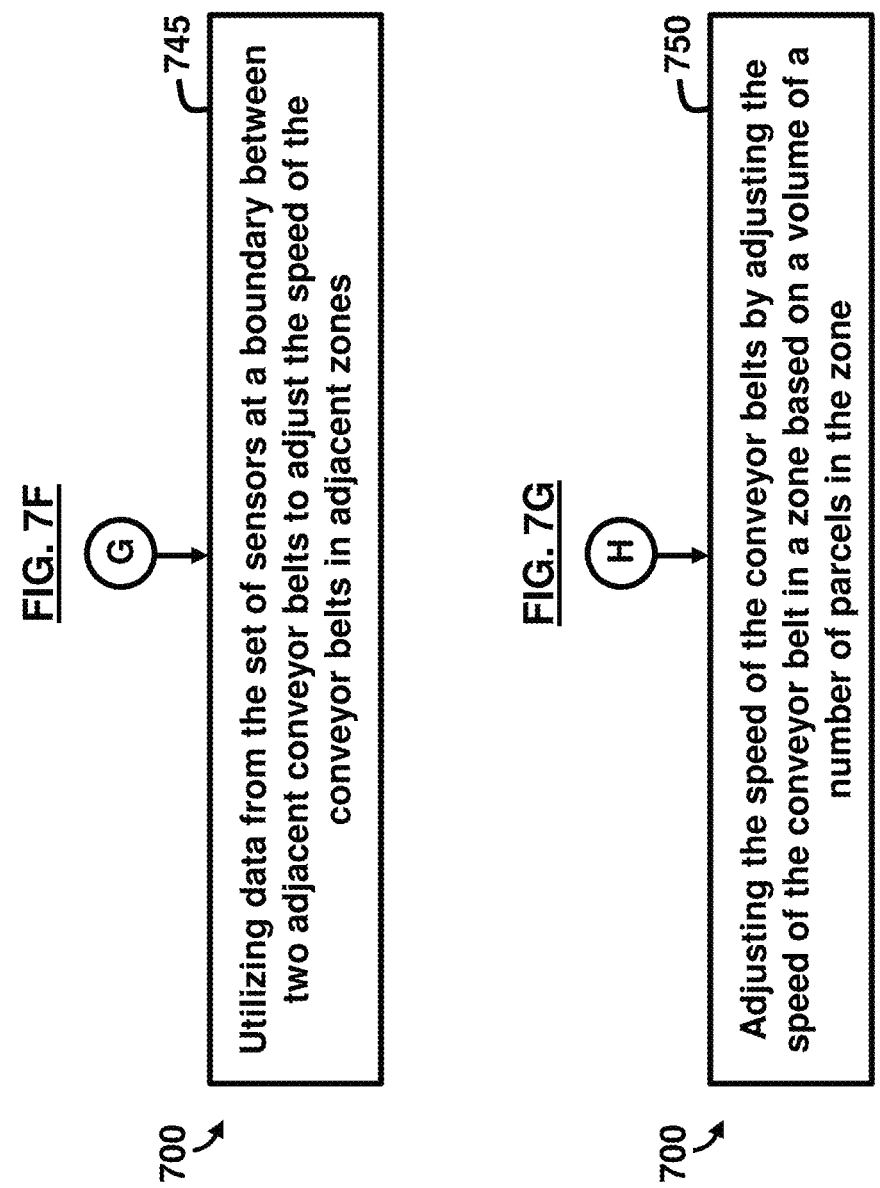
FIG. 7F is a flow diagram illustrating another method for adjusting the speed of the conveyor belts of the conveyor belt system, according to an embodiment herein.
FIG. 7G is a flow diagram illustrating another method for adjusting the speed of the conveyor belts of the conveyor belt system, according to an embodiment herein.
Figures 7H, 7I:
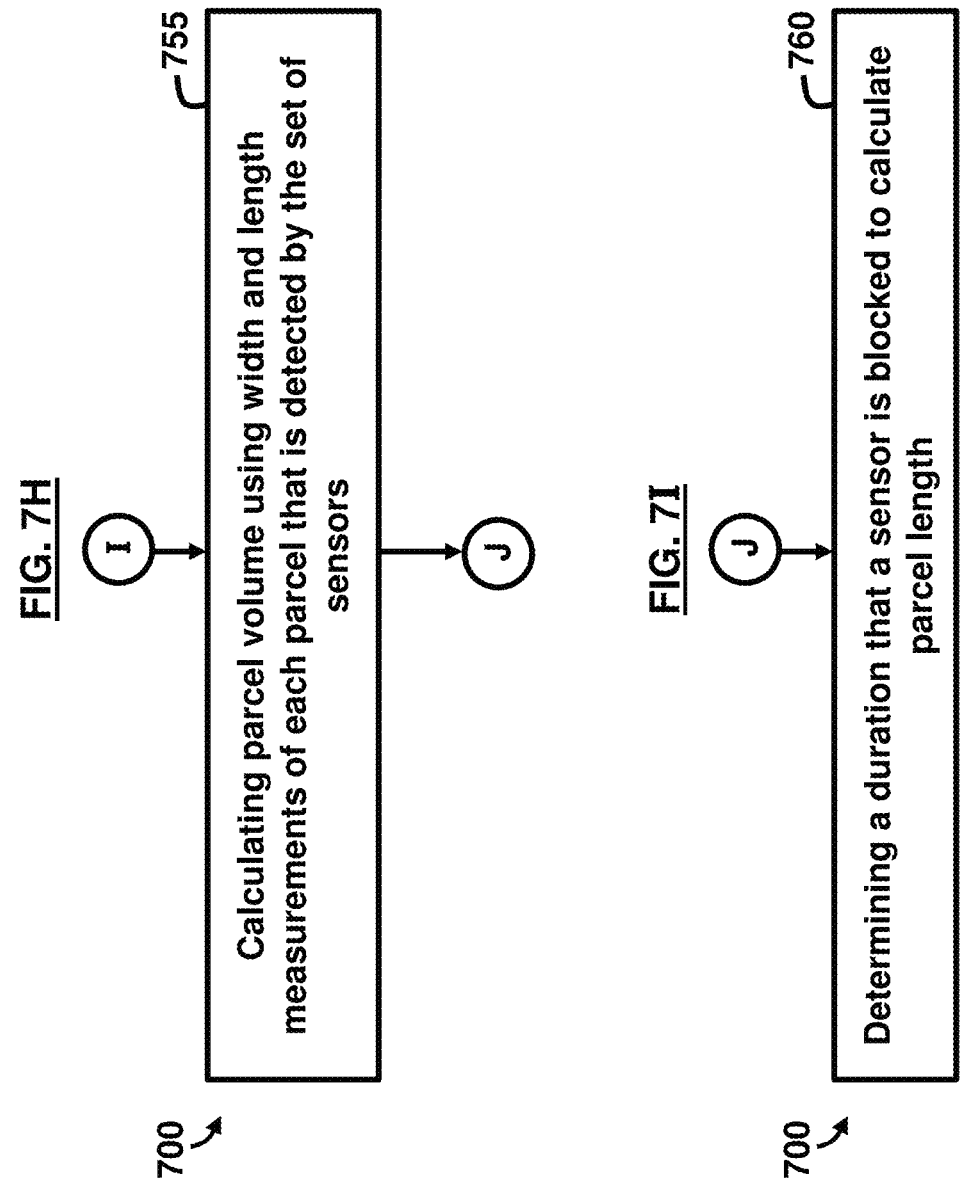
FIG. 7H is a flow diagram illustrating a method for calculating parcel volume, according to an embodiment herein.
FIG. 7I is a flow diagram illustrating a method for calculating parcel length, according to an embodiment herein.

As shown in FIGS. 7A through 7H, with reference to FIGS. 1 through 6, another embodiment provides a method 700 for controlling parcel distribution on a conveyor belt system 10. As shown in FIG. 7A, the method 700 comprises receiving (710) parcel data 16 from a set of sensors 15 on the conveyor belt system 10; analyzing (715) the parcel data 16 to determine a volume of parcels 20 in each zone (1 . . . X) of the conveyor belt system 10; and adjusting (720) a speed of individual conveyor belts 10x independently of each other based on the analyzed parcel data 16 to maintain optimal parcel distribution in the conveyor belt system 10. As shown in FIG. 7B, the method 700 may comprise reducing (725) the speed if a parcel volume on a particular conveyor belt 10x exceeds a threshold limit. As shown in FIG. 7C, the method 700 may comprise maintaining or increasing (730) the speed of the conveyor belts 10x if a parcel volume on a particular conveyor belt 10x is below a threshold limit. As shown in FIG. 7D, the method 700 may comprise adjusting (735) the speed of the conveyor belts 10x independently of each other to disperse parcel volume on a particular conveyor belt 10x. As shown in FIG. 7E, the method 700 may comprise adjusting (740) the speed of the conveyor belts 10x based on a comparison of a volume of parcels 20 in a particular zone (1 . . . X) with a volume of parcels 20 in adjacent zones (1 . . . X). As shown in FIG. 7F, the method 700 may comprise utilizing (745) data 16 from the set of sensors 15 at a boundary 12 between two adjacent conveyor belts 10x to adjust the speed of the conveyor belts 10x in adjacent zones (1 . . . X). As shown in FIG. 7G, the method 700 may comprise adjusting (750) the speed of the conveyor belts 10x by adjusting the speed of the conveyor belt 10x in a zone (1 . . . X) based on a volume of a number of parcels 20 in the zone (1 . . . X). As shown in FIG. 7H, the method 700 may comprise calculating (755) parcel volume using width and length measurements of each parcel that is detected by the set of sensors 15. As shown in FIG. 7I, the method 700 may comprise determining (760) a duration that a sensor 15 is blocked to calculate parcel length.

In some examples, the processor 50 described herein and/or illustrated in the figures may be embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process and/or execute computer logic instructions capable of providing digital and/or analog signals for performing various functions as described herein including controlling the operations of the conveyor belt and sensor system 10 and associated components. In some examples, the processor 50 may comprise a central processing unit (CPU) of the conveyor belt and sensor system 10. In other examples the processor 50 may be a discrete component independent of other processing components in the conveyor belt and sensor system 10. In other examples, the processor 50 may be a microprocessor, microcontroller, hardware engine, hardware pipeline, and/or other hardware-enabled device suitable for receiving, processing, operating, and performing various functions for the conveyor belt and sensor system 10. The processor 50 may be provided in the conveyor belt and sensor system 10, coupled to the conveyor belt and sensor system 10, or communicatively linked to the conveyor belt and sensor system 10 from a remote networked location, according to various examples. The processor 50 may be hardwired or wirelessly connected to the conveyor belt and sensor system 10. Moreover, the processor 50 may control operations of the set of sensors 15 as well as the speed control of the conveyor belts 10x in the conveyor belt and sensor system 10.

The processor 50 may comprise various controllers, switches, processors, and circuits, which may be embodied as hardware-enabled modules and may be a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that include electronic circuits process computer logic instructions capable of providing digital and/or analog signals for performing various functions as described herein. The various functions can further be embodied and physically saved as any of data structures, data paths, data objects, data object models, object files, database components. For example, the data objects could include a digital packet of structured data. Example data structures may include any of an array, tuple, map, union, variant, set, graph, tree, node, and an object, which may be stored and retrieved by computer memory and may be managed by processors, compilers, and other computer hardware components. The data paths can be part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be physical locations in computer memory and can be a variable, a data structure, or a function. Some examples of the modules include relational databases (e.g., such as Oracle® relational databases), and the data objects can be a table or column, for example. Other examples include specialized objects, distributed objects, object-oriented programming objects, and semantic web objects. The data object models can be an application programming interface for creating HyperText Markup Language (HTML) and Extensible Markup Language (XML) electronic documents. The models can be any of a tree, graph, container, list, map, queue, set, stack, and variations thereof, according to some examples. The data object files can be created by compilers and assemblers and contain generated binary code and data for a source file. The database components can include any of tables, indexes, views, stored procedures, and triggers.

Various examples described herein may include both hardware and software elements. The examples that are implemented in software may include firmware, resident software, microcode, etc. Other examples may include a computer program product configured to include a pre-configured set of instructions, which when performed, may result in actions as stated in conjunction with the methods described above. In an example, the preconfigured set of instructions may be stored on a tangible non-transitory computer readable medium or a program storage device containing software code.

The conveyor belt and sensor system 10 comprises or is communicatively linked to a processor 50 and a computer-readable storage medium 51. Processor 50 may include a central processing unit, microprocessors, hardware engines, and/or other hardware devices suitable for retrieval and execution of instructions stored in a computer-readable storage medium 51. Processor 50 may fetch, decode, and execute computer-executable instructions to enable execution of locally-hosted or remotely-hosted applications for controlling action of the conveyor belt and sensor system 10. The remotely-hosted applications may be accessible on remotely-located devices such as a remote communication device (not shown), which is accessible through a wired or wireless connection or network (not shown). For example, the remote communication device may be a laptop computer, tablet device, smartphone, or notebook computer. As an alternative or in addition to retrieving and executing instructions, processor 50 may include electronic circuits including a number of electronic components for performing the functionality of the computer-executable instructions.

The computer-readable storage medium 51 may be any electronic, magnetic, optical, or other physical storage device that stores executable instructions. Thus, the computer-readable storage medium 51 may be, for example, Random Access Memory, an Electrically-Erasable Programmable Read-Only Memory, volatile memory, non-volatile memory, flash memory, a storage drive (e.g., a hard drive), a solid-state drive, optical drive, any type of storage disc (e.g., a compact disc, a DVD, etc.), and the like, or a combination thereof. In one example, the computer-readable storage medium 51 may include a non-transitory computer-readable storage medium 51. The computer-readable storage medium 51 may be encoded with executable instructions for enabling execution of remotely-hosted applications accessed on the remote communication device.

Figure 8A:
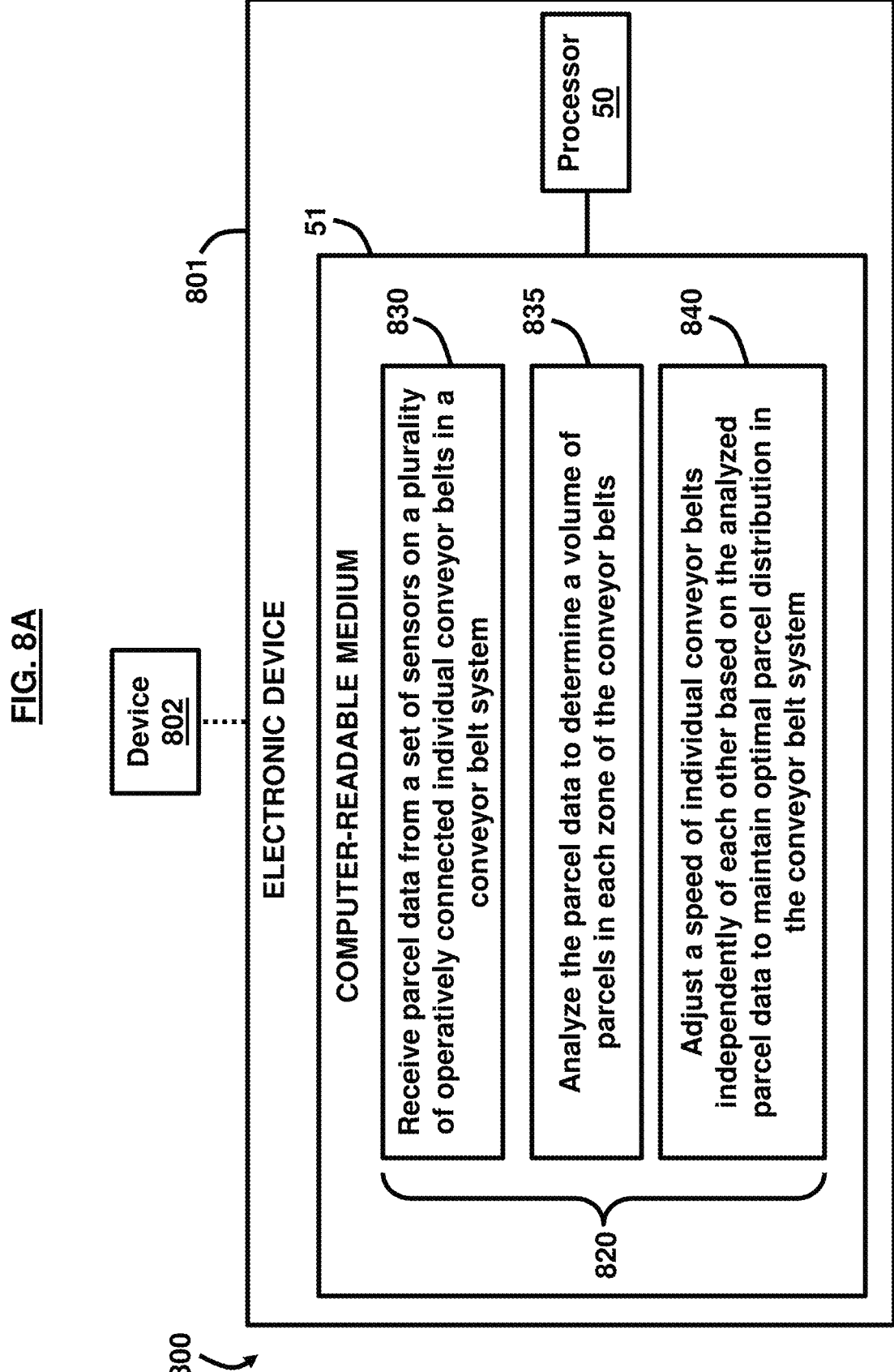
FIG. 8A is a block diagram illustrating a system executing computer-executable instructions for controlling parcel distribution on a conveyor belt system, according to an embodiment herein.

FIGS. 8A and 8B, with reference to FIGS. 1 through 7I, illustrate another example of the system 800 for controlling parcel distribution on a conveyor belt system 10. The system 800 comprises an electronic or computing device 801 containing a computer-readable storage medium 51, and a remote communication device 802 communicatively linked to the electronic device 801. In the example of FIGS. 8A and 8B, the electronic device 801 includes the processor 50 and the computer-readable storage medium 51. Processor 50 may include a central processing unit, microprocessors, hardware engines, and/or other hardware devices suitable for retrieval and execution of instructions stored in a computer-readable storage medium 51. Processor 50 may fetch, decode, and execute computer-executable instructions 820 to enable execution of locally-hosted or remotely-hosted applications for controlling action of the electronic device 801. The remotely-hosted applications may be accessible on remotely-located devices; for example, the remote communication device 802. For example, the remote communication device 802 may be a laptop computer, tablet device, smartphone, or notebook computer. As an alternative or in addition to retrieving and executing instructions, processor 50 may include electronic circuits including a number of electronic components for performing the functionality of the computer-executable instructions 820.

The computer-readable storage medium 51 may be any electronic, magnetic, optical, or other physical storage device that stores executable instructions. Thus, the computer-readable storage medium 51 may be, for example, Random Access Memory, an Electrically-Erasable Programmable Read-Only Memory, volatile memory, non-volatile memory, flash memory, a storage drive (e.g., a hard drive), a solid-state drive, optical drive, any type of storage disc (e.g., a compact disc, a DVD, etc.), and the like, or a combination thereof. In one example, the computer-readable storage medium 51 may include a non-transitory computer-readable storage medium 51. The computer-readable storage medium 51 may be encoded with executable instructions for enabling execution of remotely-hosted applications accessed on the remote communication device 802. In an example, the processor 50 of the electronic device 801 executes the computer-executable instructions 820 that when executed cause the electronic device 801 to perform computer-executable instructions 830-855.

As shown in FIG. 8A, the computer-readable medium 205 is configured for storing instructions 820 for controlling parcel distribution on a conveyor belt system 10. The system 800 comprises computer-readable storage medium 51 comprising computer-executable instructions 820, which may be performed in any suitable order, that when executed cause a processor 50 of an electronic or computing device 801 to receive (830) parcel data 16 from a set of sensors 15 on a plurality of operatively connected individual conveyor belts 10x in a conveyor belt system 10; analyze (835) the parcel data 16 to determine a volume of parcels 20 in each zone (1 . . . X) of the conveyor belts 10x; and adjust (840) a speed of individual conveyor belts 10x independently of each other based on the analyzed parcel data 16 to maintain optimal parcel distribution in the conveyor belt system 10.

As shown in FIG. 8B, the various blocks are not necessarily sequential and may be practiced independent from each other and/or in any suitable order. As indicated in FIG. 8B, the instructions 820, when executed, may further cause the processor 50 to control (845) the set of sensors 15 to detect a presence or absence of parcels 20 on the conveyor belt system 10. Moreover, the instructions 820, when executed, may further cause the processor 50 to receive (850) the data 16 from the set of sensors 15 and determine the volume of parcels 20 in each zone (1 . . . X) based on width and length measurements of the parcels 20 obtained from the set of sensors 15. Furthermore, the instructions 820, when executed, may further cause the processor 50 to utilize (855) parcel distribution in an adjacent zone ahead (X+1) and an adjacent zone behind (X−1) a particular zone (1 . . . X) to determine whether to make speed adjustments of the conveyor belt 10x in the particular zone (1 . . . X).

The following is an example algorithm utilized by the processor 50 for practicing the embodiments herein. Other algorithms are possible, and the embodiments herein are not restricted to this particular algorithm. The example algorithm continuously monitors the volume of parcels 20 in different zones (1 . . . X) of the conveyor belt system 10 using a set of sensors 15. Based on the collected data 16, the algorithm dynamically adjusts the speeds of individual conveyor belts 10x to prevent overcrowding and maintain a smooth parcel flow.

15

Example Algorithm

Definitions (x) represents a specific zone in the conveyor belt system.
(Speed(x)) denotes the speed of the conveyor belt in Zone (x).
(Volume(x)) represents the volume of parcels in Zone (x).
(Duration(x)) is the duration for which the cross sensor in Zone (x) is blocked.

Algorithm Steps:
1. Initialize:
   Set (Speed(x)) for all zones to a default value.
   Begin monitoring from Zone (1).
2. Data Acquisition:
   Measure (Speed(x)) for the current zone.
   Check if left or right sensors in Zone (x) are blocked.
   Calculate (Width(x)) using left and right sensors.
   Determine (Duration(x)) for which the cross sensor in Zone (x) is blocked.
   Calculate (Length(x)) using (Speed(x)) and (Duration (x)).
   Calculate (Volume(x)) as (Width(x) times Length(x)).
3. Rating Assignment:
   Assign a rating (HEAVY, NORM, LIGHT) to Zone (x) based on (Volume(x)).
4. Look-Ahead and Look-Behind:
   Repeat steps 2-3 for zones (x+1) and (x−1).
   Collect data for adjacent zones to aid decision-making.
5. Control Decision:
   If Zone (x) is LIGHT, maintain speeds.
   If Zone (x) is NORMAL, maintain speeds.
   If Zone (x) is HEAVY:
      If (Volume(x+1)) is LIGHT, speed up (Speed(x+1)).
      If (Volume(x−1)) is LIGHT, slow down (Speed(x)).
6. Adjust Conveyor Belt Speeds:
   Adjust speeds based on control decisions (speed up, slow down) for a very short duration (e.g., less than 1 second).
7. Repeat:
   Return to step 2 and continue monitoring and adjusting conveyor belt speeds.

Note:
The algorithm uses a feedback loop, continuously repeating the process for ongoing control.
Ratings (HEAVY, NORM, LIGHT) are used to make decisions on speed adjustments.
The adjustment duration is kept short to respond quickly to changes in parcel volume.

The embodiments herein provide a technique to alter the speed of a conveyor belt system 10 to alleviate the problem of having too high a volume of parcels 20 in a concentrated area of the conveyor belt 10x by using a series of sensors 15 to detect the volume of parcels 20 in a particular zone (1 . . . X) of the conveyor belt system 10 and to increase, decrease, or maintain the speed of the conveyor belt 10x to disperse highly concentrated volume of parcels 20 from one particular zone (1 . . . X) in order to allow for a more controlled and manageable output of the parcels 20 from the conveyor belt 10x downstream.

The foregoing description of the specific embodiments will so fully reveal the general nature of the embodiments herein that others may by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:
1. An automated parcel distribution system comprising:
a plurality of operatively connected individual conveyor belts arranged in zones;
a set of sensors arranged on lateral sides of the conveyor belts and at the boundaries between adjacent conveyor belts, wherein the set of sensors comprises, for each zone, a cross sensor positioned on a first lateral side and configured to detect parcels across an entire width of the conveyor belt using a counterpart component on a second lateral side, a right sensor positioned on the first lateral side configured to detect parcels within a first limited portion of the conveyor belt width, and a left sensor positioned on the second lateral side configured to detect parcels within a second limited portion of the conveyor belt width; and
a processor configured to calculate a three-dimensional virtual box volume for parcels in each zone by determining parcel width based on which combination of the cross sensor, right sensor, and left sensor detect each parcel, determining parcel length based on a duration each sensor is blocked multiplied by conveyor belt speed, and generating a volume measurement from the width and length determinations, assign a volume density rating of HEAVY, NORMAL, or LIGHT to each zone based on the calculated virtual box volume exceeding or falling below predetermined thresholds, compare the volume density rating of each zone with volume density ratings of immediately adjacent upstream and downstream zones, and adjust the speed of individual conveyor belts for predetermined time periods of less than one second to disperse concentrated volumes from HEAVY-rated zones to adjacent LIGHT-rated zones, wherein the speed adjustment is based on the volume density comparison and not on achieving predetermined spacing between parcels.
2. The system of claim 1, wherein the processor is to receive the data from the set of sensors and determine the volume of parcels in each zone based on width and length measurements of the parcels obtained from both of the cross sensors detecting the entire width and the lateral sensors detecting portions of the width.
3. The system of claim 1, wherein the processor is to slow down, speed up, or maintain a speed of the conveyor belts for a predetermined period in order to evenly distribute the parcels on the conveyor belts.
4. The system of claim 1, comprising a counterpart component aligned with at least one sensor of the set of sensors to provide a limit to a distance of a sensing view of the at least one sensor.
5. The system of claim 1, wherein the set of sensors are arranged on lateral sides and at the boundary between two adjacent conveyor belts.
6. The system of claim 1, wherein the plurality of operatively connected individual conveyor belts are aligned together and linked to move independently of each other.
7. The system of claim 3, wherein the processor is to control the speed of each conveyor belt independently.

8. A method for controlling parcel distribution on a conveyor belt system, the method comprising:

receiving parcel data from a set of sensors on the conveyor belt system, wherein for each zone in the conveyor belt system, the set of sensors comprises a cross sensor detecting across an entire conveyor width, a right sensor detecting a first lateral portion, and a left sensor detecting a second lateral portion;

analyzing the parcel data to determine a volume of parcels in each zone of the conveyor belt system by calculating parcel width based on determining which sensors of the cross sensor, right sensor, and left sensor are simultaneously blocked by each parcel, calculating parcel length by multiplying sensor blocking duration by conveyor belt speed, creating a three-dimensional virtual box volume measurement from the width and length calculations, and assigning volume density ratings to each zone based on comparing the virtual box volume to threshold values; and adjusting a speed of individual conveyor belts independently of each other based on the analyzed parcel data to maintain optimal parcel distribution in the conveyor belt system, wherein the adjusting of the speed comprises comparing volume density ratings between each zone and its immediately adjacent upstream and downstream zones, when a zone has a HEAVY volume density rating and an adjacent zone has a LIGHT volume density rating, temporarily adjusting conveyor belt speeds for a duration of less than one second to transfer parcel volume from the HEAVY zone to the LIGHT zone, and repeating the volume determination and speed adjustment in a continuous feedback loop to disperse concentrated parcel volumes across zones without establishing predetermined fixed spacing between parcels.

9. The method of claim 8, comprising reducing the speed if a parcel volume on a particular conveyor belt exceeds a threshold limit.

10. The method of claim 8, comprising maintaining or increasing the speed of the conveyor belts if a parcel volume on a particular conveyor belt is below a threshold limit.

11. The method of claim 8, comprising adjusting the speed of the conveyor belts independently of each other to disperse parcel volume on a particular conveyor belt.

12. The method of claim 8, comprising adjusting the speed of the conveyor belts based on a comparison of a volume of parcels in a particular zone with a volume of parcels in adjacent zones.

13. The method of claim 8, comprising utilizing data from the set of sensors at a boundary between two adjacent conveyor belts to adjust the speed of the conveyor belts in adjacent zones.

14. The method of claim 8, comprising adjusting the speed of the conveyor belts by adjusting the speed of the conveyor belt in a zone based on a volume of a number of parcels in the zone.

15. The method of claim 8, comprising calculating parcel volume using width and length measurements of each parcel that is detected by the set of sensors.

16. The method of claim 15, comprising determining a duration that a sensor is blocked to calculate parcel length.

17. A computer-readable storage medium comprising computer-executable instructions that when executed cause a processor of a computing device to:

receive parcel data from a set of sensors on a plurality of operatively connected individual conveyor belts in a conveyor belt system, wherein the sensors comprise, for each conveyor belt zone, a cross sensor detecting full width, a right sensor detecting a right portion, and a left sensor detecting a left portion;

analyze the parcel data to determine a volume of parcels in each zone of the conveyor belts by determining a width measurement for each parcel based on a pattern of which of the cross sensor, right sensor, and left sensor detect the parcel, determining a length measurement for each parcel based on sensor blocking duration and belt speed, calculating a virtual box volume using the width and length measurements, and categorizing each zone as having HEAVY, NORMAL, or LIGHT volume density based on the virtual box volume; and adjust a speed of individual conveyor belts independently of each other based on the analyzed parcel data to maintain optimal parcel distribution in the conveyor belt system, wherein adjusting the speed comprises implementing a look-ahead and look-behind control algorithm that compares volume density of each zone with its adjacent zones, dispersing concentrated volumes by temporarily speeding up or slowing down individual conveyor belts for periods less than one second when volume density differences exist between adjacent zones, and continuously monitoring and adjusting to prevent parcel backup and overcrowding rather than achieving predetermined pitch spacing.

18. The computer-readable storage medium of claim 17, wherein the instructions, when executed, further cause the processor to control the set of sensors to detect a presence or absence of parcels on the conveyor belt system.

19. The computer-readable storage medium of claim 17, wherein the instructions, when executed, further cause the processor to receive the data from the set of sensors and determine the volume of parcels in each zone based on width and length measurements of the parcels obtained from the set of sensors.

20. The computer-readable storage medium of claim 17, wherein the instructions, when executed, further cause the processor to utilize parcel distribution in an adjacent zone ahead and an adjacent zone behind a particular zone to determine whether to make speed adjustments of the conveyor belt in the particular zone.

\* \* \* \* \*